United States Patent
D (10) Patent No.: US 8,959,209 B1
(45) Date of Patent: Feb. 17, 2015

(54) SYSTEMS AND METHODS TO INDICATE COMPATIBILITY

(75) Inventor: Rajesh Kumar D, Chennai (IN)

(73) Assignee: Symantec Corporation, Mountain View, CA (US)

( * ) Notice: Subject to any disclaimer, the term of this patent is extended or adjusted under 35 U.S.C. 154(b) by 10 days.

(21) Appl. No.: 13/556,493

(22) Filed: Jul. 24, 2012

(51) Int. Cl.
*G06F 15/173* (2006.01)

(52) U.S. Cl.
USPC .......................... 709/224; 709/217; 707/723

(58) Field of Classification Search
CPC .......... G06F 17/30864; G06F 17/3053; G06F 17/30528; G06F 17/30902; H04L 67/303; H04L 69/24; H04L 67/2838
USPC .......... 709/224, 204, 225, 217–219; 715/205, 715/234; 707/999.102, 723
See application file for complete search history.

(56) References Cited

U.S. PATENT DOCUMENTS

| | | | |
|---|---|---|---|
| 8,516,308 B1 * | 8/2013 | Gill et al. | 714/38.1 |
| 2003/0061283 A1 * | 3/2003 | Dutta et al. | 709/204 |
| 2005/0022176 A1 * | 1/2005 | Ramachandran et al. | 717/170 |
| 2008/0027967 A1 * | 1/2008 | Garbow et al. | 707/102 |
| 2009/0100322 A1 * | 4/2009 | Phillips et al. | 715/205 |
| 2011/0269437 A1 * | 11/2011 | Marusi et al. | 455/414.1 |
| 2013/0166678 A1 * | 6/2013 | Barak et al. | 709/217 |

* cited by examiner

*Primary Examiner* — Liangche A Wang
*Assistant Examiner* — Abdulkader M Alriyashi
(74) *Attorney, Agent, or Firm* — Holland & Hart LLP (57) ABSTRACT

A computer-implemented method to indicate compatibility is described. A link to a web page is obtained. A set of capabilities associated with a device is obtained. A set of requirements associated with the web page is obtained. A compatibility result is determined for the web page based on the set of capabilities and the set of requirements. The compatibility result is indicated in connection with the link to the web page.

17 Claims, 9 Drawing Sheets

SYSTEMS AND METHODS TO INDICATE COMPATIBILITY

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

The number of devices that are able to access the Internet continues to increase. In many cases, these devices are mobile devices. Unfortunately, devices range in capabilities. For example, a device may not support one or more of the various types of content that may be available on a web page. In some cases, a web page may be accessed to determine if the content is supported on a particular device. However, this may waste bandwidth and time if some or all of the content on the web page is not supported by the device.

SUMMARY

A computer-implemented method to indicate compatibility is described. A link to a web page is obtained. A set of capabilities associated with a device is obtained. A set of requirements associated with the web page is obtained. A compatibility result is determined for the web page based on the set of capabilities and the set of requirements. The compatibility result is indicated in connection with the link to the web page.

The compatibility result may be indicated in a location that is in proximity to the link to the web page. Additionally or alternatively, the compatibility result may be indicated when an input device performs a hovering action over the link to the web page. In some cases, the compatibility result may be indicated as a percentage. In some configurations, indicating the compatibility result includes displaying the compatibility result.

The compatibility result may include a rendering compatibility, a functional compatibility, or a combined compatibility. In some cases, the combined compatibility may include a weighted combination of the rendered compatibility and the functional compatibility.

The set of capabilities may include a set of rendering capabilities. The set of requirements may include a set of rendering requirements. In some configurations, the rendering compatibility is based on the set of rendering capabilities and the set of rendering requirements.

The set of capabilities may include a set of functional capabilities. The set of requirements may include a set of functional requirements. In some configurations, the functional compatibility is based on the set of functional capabilities and the set of functional requirements.

In some cases, the device may be tested to determine the set of capabilities. In some cases, the web page may be tested to determine the set of requirements.

A computing device configured to indicate compatibility is also described. The computing device includes a processor, memory in electronic communication with the processor, and instructions stored in the memory. The instructions being executable by the processor to obtain a link to a web page. The instructions also being executable by the processor to obtain a set of capabilities associated with a device. The instructions additionally being executable by the processor to obtain a set of requirements associated with the web page. The instructions also being executable by the processor to determine a compatibility result for the web page based on the set of capabilities and the set of requirements. The instructions further being executable by the processor to indicate the compatibility result in connection with the link.

A computer-program product to indicate compatibility is additionally described. The computer-program product includes a non-transitory computer-readable storage medium that stores computer executable instructions. The instructions being executable by a processor to obtain a link to a web page. The instructions also being executable by the processor to obtain a set of capabilities associated with a device. The instructions additionally being executable by the processor to obtain a set of requirements associated with the web page. The instructions also being executable by the processor to determine a compatibility result for the web page based on the set of capabilities and the set of requirements. The instructions further being executable by the processor to indicate the compatibility result in connection with the link.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In some cases, a device may not support one or more of the various types of content that may be available on the Internet.

For example, some devices (iOS devices, for example) may not support Flash content. In another example, some devices (e.g., android browser, for example) may not support scalable vector graphics (e.g., svg formats). In many cases, users may have to visit the web page (which may require downloading the entire content of the web page, for example) to determine if the web page is supported on their device. Often, visiting an unsupported web page results in wasted bandwidth and time.

The systems and methods described herein allow a user to determine if a web page is supported before visiting (i.e., before downloading content) the web page itself. In some configurations, the systems and methods described herein may indicate the percentage of support of a web page for the device. In some configurations, this may allow a user to choose whether to visit the web page. For instance, the user may determine whether he should visit the page based on the percentage of the support of a web page for his device.

In some configurations, web compatibility tests may be performed on the device to determine what properties (e.g., tags, CSS Properties, Flash, JavaScript, ActionScript, events, etc.) are supported on the device. In various situations, web page content may be compared with these properties to determine the level (e.g., percentage) of support of the web page. For instance, a percentage of support of a web page may be computed and shown to the user based on the comparison.

In some cases, web page support may be categorized into two areas. For example, one area may correspond to the user interface (UI) of the web page (how well the page visually renders on the device, for example) and another area may correspond to the functionality of the web page (whether the events of the web page are triggered in the device, for example). In various situations, evaluating these areas separately may allow a user to determine the support based on the area that they may desire to use. For example, if the user desires to read the content of the web page, then the user may use the indication (e.g., percentage) of UI support to determine whether to visit the web page. In another example, if the user desires to fill in a form, book a ticket, etc., (which requires the functionality support, for example), then the user may use the indication (e.g., percentage) of functionality support to determine whether to visit the web page.

As used herein, the terms web page and web site may be used interchangeably. In some cases, a web site may include one or more related web pages.

Figure 1:
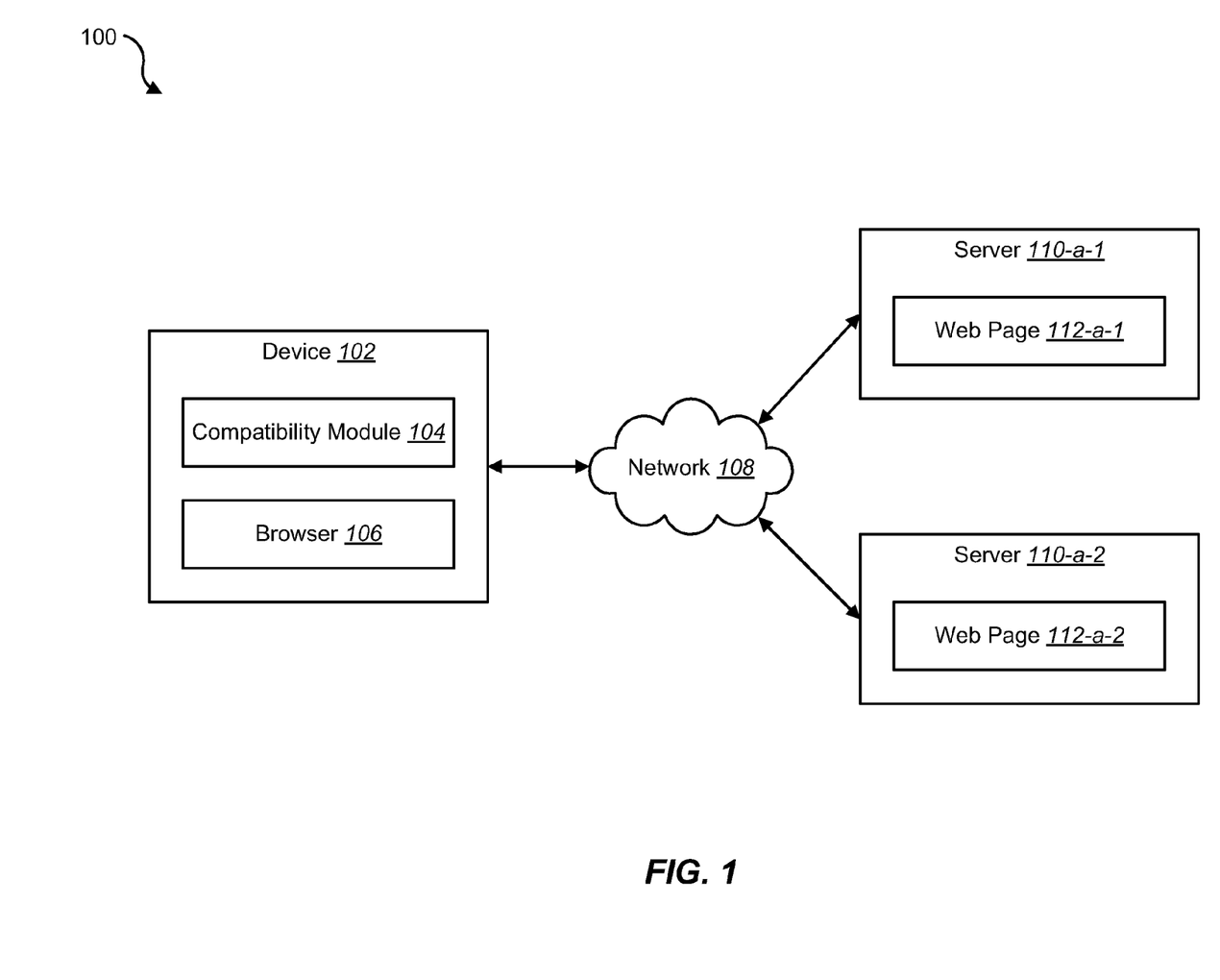
FIG. 1 is a block diagram illustrating one embodiment of an environment, in which the present systems and methods may be implemented.

Referring now to the figures, FIG. 1 is a block diagram illustrating one embodiment of an environment 100, in which the present systems and methods may be implemented. In one embodiment, a device 102 may include a compatibility module 104 and a browser 106. Examples of devices 102 include mobile devices, tablets, cellular phones, computers, servers, etc. In one example, the device 102 may be a mobile device with limited capabilities (e.g., the device 102 may not be capable of supporting the various types of content that are available on the Internet).

In some configurations, the device 102 may communicate with one or more other devices (e.g., servers 110) through a network 108. Examples of networks 108 include packet switched networks, internet protocol (IP) networks, proprietary networks, etc. For instance, the network 108 may include telephone lines, fiber optic cables, cellular networks, wireless networks, satellite networks, undersea telephone cables, and the like. In some cases, the network 108 may be the Internet.

In one example, the browser 106 (e.g., web browser) may access one or more web pages 112 through the network 108. The one or more web pages 112 may be hosted by the one or more other devices, such as the servers 110. The browser 106 may access a first server 110-*a*-1 to visit a first web page 112-*a*-1 and may access a second server 110-*a*-2 to visit a second web page 112-*a*-2. In one example, a web page 112 may include a link (e.g., uniform resource locator (URL)) to another web page 112. For instance, the first web page 112-*a*-1 may include a link to the second web page 112-*a*-2. In this example, the browser 106 may obtain a link to the second web page 112-*a*-2 by visiting the first web page 112-*a*-1.

In one embodiment, the compatibility module 104 may indicate the compatibility of a web page 112 with respect to the device 102 and/or the browser 106. For instance, the compatibility module 104 may obtain the link to the second web page 112-*a*-2 when the browser 106 accesses the first web page 112-*a*-1. In one example, the compatibility module 104 may indicate the compatibility of the second web page 112-*a*-2 with respect to the device 102. For instance, the compatibility module 104 may indicate the whether the device 102 is capable of supporting one or more of the various types of content (e.g., rendering content, functional content) included in the second web page 112-*a*-2. In one example, the compatibility module 104 may indicate the level of compatibility in connection with the link. The level of compatibility may be provided next to the link, when the link is clicked, or by changing the properties of the link (e.g., color, size, etc.). In some configurations, the compatibility module 104 may display the indicated compatibility (via the browser 106, for example). The compatibility module 104 is discussed in greater detail below.

Figure 2:
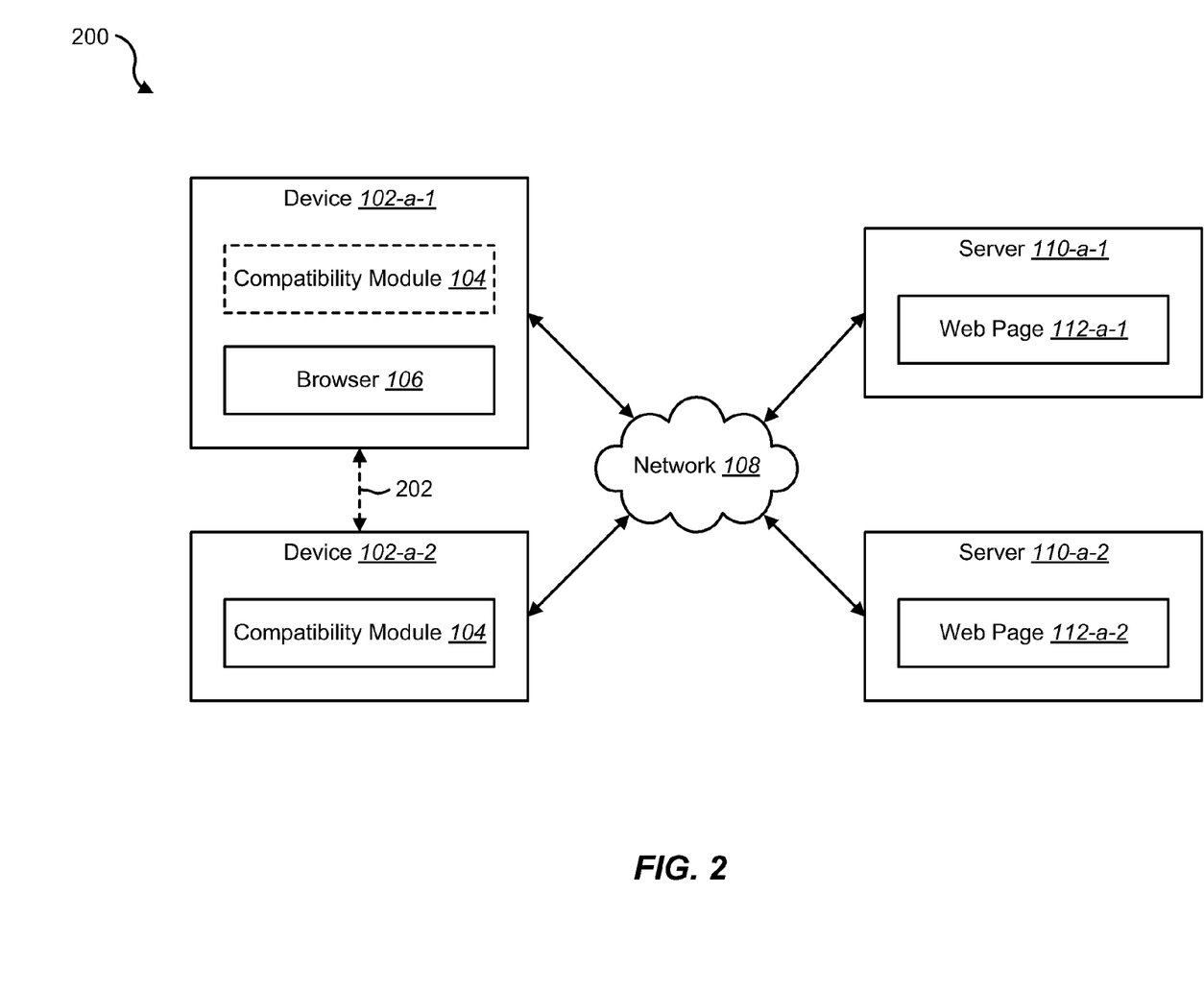
FIG. 2 is a block diagram illustrating another embodiment of an environment, in which the present systems and methods may be implemented.

FIG. 2 is a block diagram illustrating another embodiment of an environment 200, in which the present systems and methods may be implemented. In one example, a first device 102-*a*-1 may include the browser 106. In some configurations, the first device 102-*a*-1 may also include the compatibility module 104. In one example, a second device 102-*a*-2 may include the compatibility module 104. The devices 102-*a*-1 and 102-*a*-2 may be an example of the device 102 of FIG. 1.

In one embodiment, the first device 102-*a*-1 may be directly coupled to the second device 102-*a*-2 through connection 202. In one example, connection 202 may be a network similar to the network 108. In one example, first device 102-*a*-1 may be a mobile device and the second device 102-*a*-2 may be a network appliance or server. In another embodiment, the first device 102-*a*-1 may communicate with the second device 102-*a*-2 through the network 108.

In some configurations, some or all of the IP traffic of the browser 106 may be passed through (e.g., filtered by, analyzed by) the second device 102-*a*-2. For instance, the browser 106 may send a request for a first web page 112-*a*-1. In some cases, the request for the first web page 112-*a*-1 may be passed through the second device 102-*a*-2 before being transmitted (through the network 108) to the first server 110-*a*-1. In one example, the first server 110-*a*-1 may respond to the request by sending the first web page 112-*a*-1 through the network 108 to the second device 102-*a*-2. In some configurations, the compatibility module 104 on the second device 102-*a*-2 may indicate the compatibility of any links within the first web page 112-*a*-1, as described above. In one example, the first web page 112-*a*-1 may include a link to a second web page 112-*a*-2 that is hosted by a second server 110-*a*-2.

In one example, the compatibility module 104 may send an altered version of the first web page 112-*a*-1 to the browser 106 (so that the indicated compatibility is displayed with the first web page 112-*a*-1 as it is rendered in the browser 106, for example). In another example, the compatibility module 104 on the second device 102-*a*-2 may communicate with the compatibility module 104 on the first device 102-*a*-1 to indicate the compatibility of a linked web page 112 with respect to the first device 102-*a*-1 (so that the compatibility module 104 on the first device 102-*a*-1 may display the indicated compatibility, for example).

Figure 3:
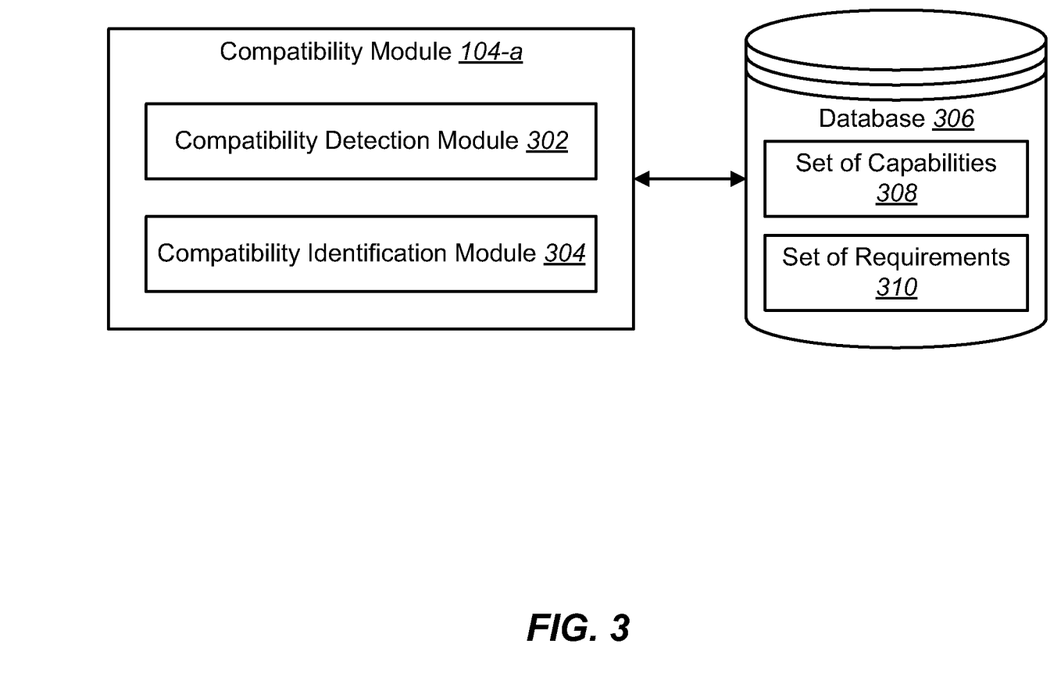
FIG. 3 is a block diagram illustrating one example of a compatibility module.

FIG. 3 is a block diagram illustrating one example of a compatibility module 104-*a*. The compatibility module 104-*a* may be one example of the compatibility module 104 illustrated in FIG. 1 or 2. In some configurations, the compatibility module 104-*a* may include a compatibility detection module 302 and a compatibility identification module 304.

In some configurations, the compatibility module 104-*a* may be coupled to a database 306. In one example, the database 306 may be local to the compatibility module 104-*a* (located within the same device, for example). In another example, the database 306 may be remote from the compatibility module 104-*a* (accessible through a network, for example).

In one embodiment, the compatibility detection module 302 may detect a set of capabilities 308 associated with a device (e.g., device 102) and/or detect a set of requirements 310 associated with a web page 112. In one example, the compatibility detection module 302 may store the set of capabilities 308 and/or the set of requirements 310 in the database 306. In some configurations, the set of capabilities 308 and/or the set of requirements 310 may be shared and/or accessible by multiple compatibility modules 104. The compatibility detection module 302 is discussed in greater detail below.

In one embodiment, the compatibility identification module 304 may identify the compatibility between a device 102 and a web page 112 based on the set of capabilities 308 associated with the device 102 and the set of requirements 310 associated with the web page 112. In some configurations, the compatibility identification module 304 may indicate and/or display the indicated capability. The compatibility identification module 304 is discussed in greater detail below.

Figure 4:
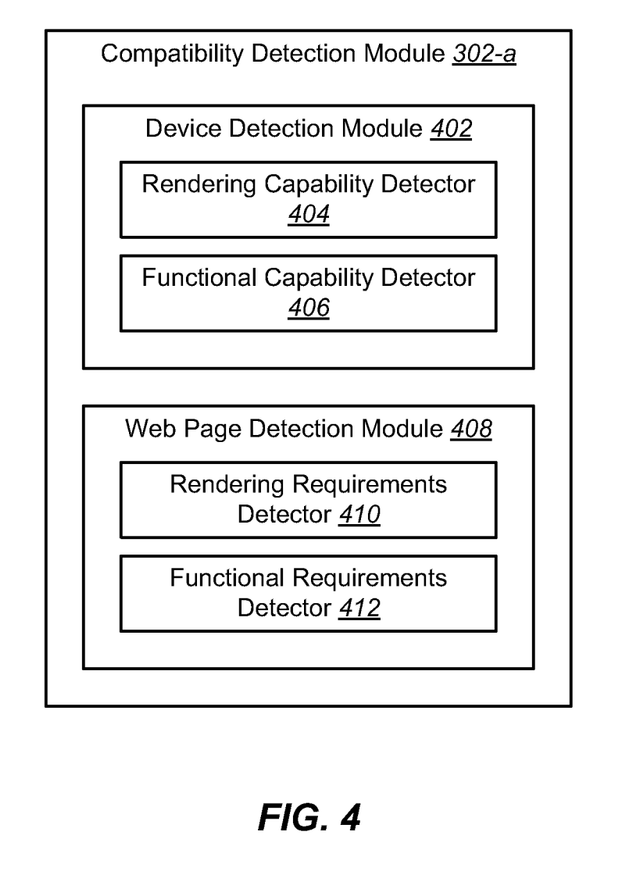
FIG. 4 is a block diagram illustrating one example of a compatibility detection module.

FIG. 4 is a block diagram illustrating one example of a compatibility detection module 302-*a*. The compatibility detection module 302-*a* may be one example of the compatibility detection module 302 illustrated in FIG. 3. In some configurations, the compatibility detection module 302-*a* may include a device detection module 402 and a web page detection module 408.

In one embodiment, the device detection module 402 may detect the capabilities of the device. In some configurations, the device detection module 402 may include a rendering capability detector 404 and a functional capability detecfor 406.

In one embodiment, the rendering capability detector 404 may detect the rendering capabilities of a device. In some cases, the rendering capabilities correspond to the ability to support each of the various rendering commands included in the various web pages of the Internet. In one example, the rendering capability detector 404 may determine if the visual content on the web page will be rendered correctly when rendered on the device 102.

In one example, the rendering capability detector 404 may test the rendering capabilities of a device by submitting various rendering scenarios (e.g., flash, svg formats, movies, graphics, styles, etc.) to the device. In some cases, the rendering capability detector 404 may determine a set of rendering capabilities for the device by monitoring the performance of the device with respect to each rendering scenario. For instance, if the device is unable to render Flash content, then the set of rendering capabilities will reflect the lack of capabilities with respect the Flash content. In one example, the set of rendering capabilities may be embodied as a list of specified renderings that the device is capable of performing. In another example, the set of rendering capabilities may be embodied as a list of specified renderings that the device is incapable of performing.

In one embodiment, the functional capability detector 406 may detect the functional capabilities of a device. In some cases, the functional capabilities correspond to the ability to support each of the various functional commands included in the various web pages of the Internet. In one example, the function capability detector 406 may determine if buttons, actions, or interactive content on a web page 112 will be functional when accessed on the device 102.

In one example, the functional capability detector 406 may test the functional capabilities of a device by submitting various functional scenarios (e.g., button clicks, field entry, JavaScript, interactive content, etc.) to the device. In some cases, the functional capability detector 406 may determine a set of functional capabilities for the device by monitoring the performance of the device with respect to each functional scenario. For instance, if the device is unable to accurately submit forms of information, then the set of functional capabilities will reflect the lack of capabilities with respect to the input fields. In one example, the set of functional capabilities may be embodied as a list of specified functions that the device is capable of performing. In another example, the set of rendering capabilities may be embodied as a list of specified functions that the device is incapable of performing.

In one embodiment, the web page detection module 408 may detect the requirements of a web page. In some configurations, the web page detection module 408 may include a rendering requirements detector 410 and a functional requirements detector 412.

In one embodiment, the rendering requirements detector 410 may detect the rendering requirements of a web page. In some cases, the rendering requirements corresponding to the way a web page may be coded to render various types of content. For example, the rendering requirements detector 410 may determine the type of rendering commands that a device will be required to process to render the web page on the device.

In one example, the rendering requirements detector 410 may detect the rendering requirements of a web page by accessing a web page and monitoring the type of rendering code being executed and the performance requirements of the rendering code. For instance, the rendering requirements detector 410 may detect the various rendering scenarios (e.g., flash, svg formats, movies, graphics, styles, etc.) used by the web page. For instance, if the rendering requirements detector 410 detects that the web page includes Flash content, then the set of rendering requirements may indicate that support for the Flash content is required. In one example, the set of rendering requirements for the web page may be embodied as a list of specific rendering functions.

In one embodiment, the functional requirements detector 412 may detect the functional requirements of a web page. In some cases, the functional requirements correspond to the various interactive functions that are included in the web page. For example, the functional requirements detector 412 may determine the type of functional commands that a device will be required to process to interact with the web page.

In one example, the functional requirements detector 412 may detect the functional requirements of a web page by accessing the web page and monitoring the type of interactive code being executed and the performance requirements of the interactive code. For instance, the functional requirements detector 412 may detect the various functional scenarios (e.g., button clicks, field entry, JavaScript, interactive content, etc.)

used in the web page. For instance, if the functional requirements detector 412 detects that the web page includes ActionScript code for submitting an input field, then the set of functional requirements may indicate that support for the ActionScript is required. In one example, the set of functional requirements for the web page may be embodied as a list of specific interactive components.

Figure 5:
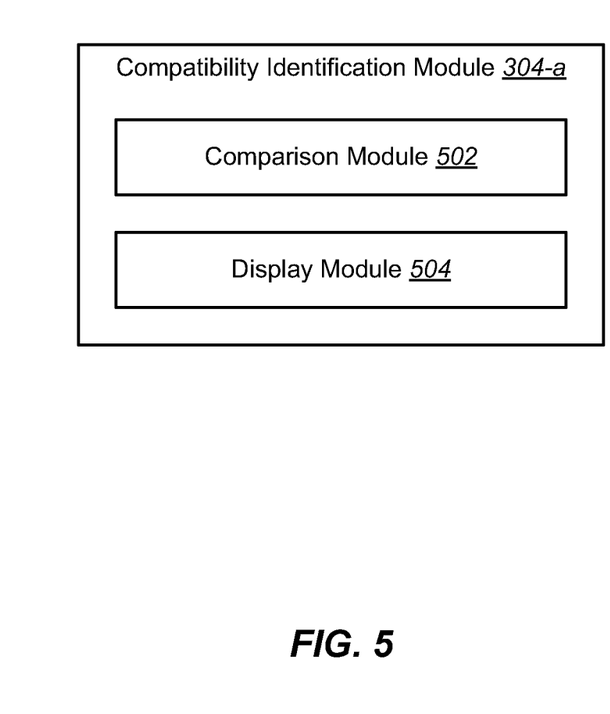
FIG. 5 is a block diagram illustrating one example of a compatibility identification module.

FIG. 5 is a block diagram illustrating one example of a compatibility identification module 304-a. The compatibility identification module 304-a may be one example of the compatibility identification module 304 illustrated in FIG. 3. In some configurations, the compatibility identification module 304-a may include a comparison module 502 and a display module 504.

In one embodiment, the comparison module 502 may compare a set of capabilities 308 associated with a device 102 and a set of requirements 310 associated with a web page 112. For example, the comparison module 502 may obtain the set of capabilities 308 and the set of requirements 310 (from the database 306, for example). In one embodiment, the comparison module 502 may compare each requirement in the set of requirements 310 with each capability in the set of capabilities 308. For example, the comparison module 502 may specifically identify any unsupported requirements. In some cases, the comparison module 502 may determine a compatibility result based on the comparison. In one example, the compatibility result may indicate, list, enumerate, etc., the level of compatibility between the device and the web page. In one example, the impact of an unsupported requirement may be weighted based on the significance of that requirement to the web page, the frequency of that requirement in the web page, the impact of the requirement on the device, and/or a variety of other criteria.

In some configurations, the set of capabilities 308 associated with a device 102 may include a set of rendering capabilities and/or a set of functional capabilities. In these cases, a rendering compatibility result may be determined based on the set of rendering capabilities and the set of rendering requirements. In some configurations, the set of requirements 310 associated with a web page 112 may include a set of rendering requirements and/or a set of functional requirements. In these cases, a functional compatibility result may be determined based on the set of functional capabilities and the set of functional requirements. In some cases, a combined compatibility result may be generated based on a combination of the rendering compatibility result and the functional compatibility result. In one example, the rendering compatibility result and the functional compatibility results may be weighted based on a determined importance of each function for the web page. For instance, if the web page includes more interactive content, then the functional compatibility result may be weighted higher and if the web page includes less interactive content, then the rendering compatibility result may be weighted higher.

In one embodiment, the display module 504 may indicate and/or display the compatibility result determined by the comparison module 502. In some cases, the compatibility result (e.g., the rendering compatibility result, the functional compatibility result, and/or the combined compatibility result) may be indicated as a percentage (e.g., a percentage of compatibility). In one example, the compatibility result may indicate the rendering compatibility result as a first percentage and the functional compatibility result as a second percentage. In some configurations, indicating a compatibility result includes displaying a compatibility result. In some configurations, the display module 504 may overlay the compatibility result next to, or close by the link to the web page.

In some configurations, the display module 504 may alter the web page to include the compatibility result into the web page. In some cases (e.g., when multiple links are provided on a web page), the display module 504 may prioritize the multiple links based on the compatibility result associated with each link. For instance, links with higher compatibility results may be rearranged to be above links with lower compatibility results.

In one example, the compatibility result may be located in close proximity (e.g., near to, next to, under, over, within a predetermined pixel distance, etc.) to the link to the web page. In another example the compatibility result may be indicated and/or displayed when a user hovers over the link to the web page. For example, the compatibility result may be indicated when an input device (e.g., mouse, stylus, pointer, finger, etc.) performs a hovering action over the link to the web page. In yet another example, the compatibility result may be displayed when the link to the web page is selected. In some cases, the compatibility result may be accompanied with a message that asks a user if they would like to continue (e.g., proceed to download the content of the web page) or cancel (e.g., go back as if the link had not been selected).

In some configurations, the compatibility identification module 304-a may store the determined compatibility results (e.g., functional, rendering, or combined result) in a database (e.g., database 306). For example, each compatibility result may be stored in connection with an indication of the web page that it corresponds to. In some cases (in the case that the compatibility result has already been determined for a web page, for example), the compatibility module 104-a may determine the compatibility result by querying the database. In one example, this may allow compatibility results to be determined without performing redundant comparisons.

It may be noted that in some configurations, a portion of the functions described herein may be performed on the local device while another portion of the functions described herein may be performed on a remote device. For example, a remote compatibility module 104 may provide the requirements of the web page and a local compatibility module 104 may find the compatibility result. For instance, this may be beneficial if the remote compatibility module is very busy and/or heavily loaded. In this example, the requirements of the web page may be provided to the local compatibility module 104 so that the local compatibility module 104 may perform the comparison (or perhaps obtain the compatibility result from the database if the comparison has been performed previously).

Figure 6:
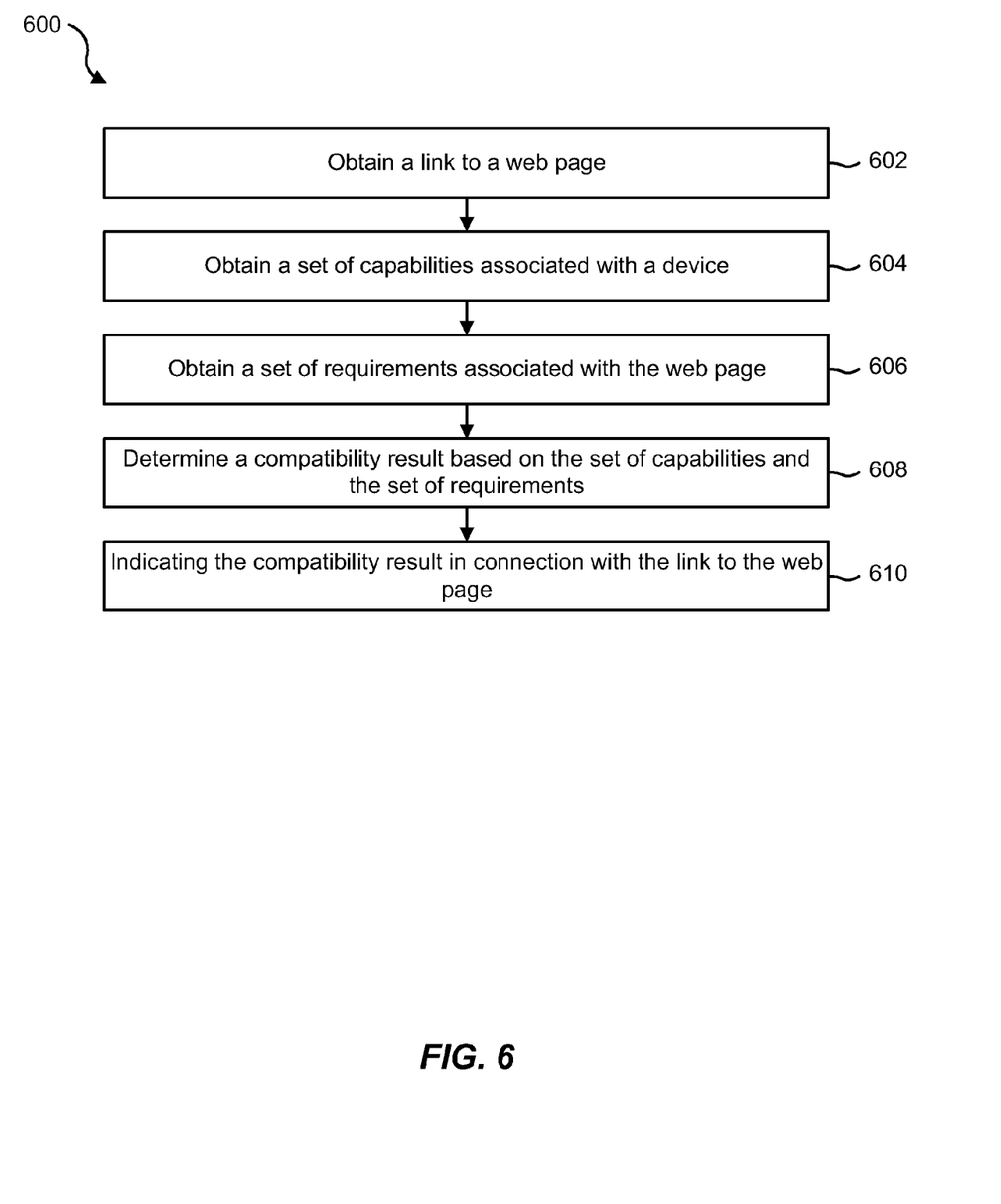
FIG. 6 is a flow diagram illustrating one example of a method to indicate compatibility.

FIG. 6 is a flow diagram illustrating one example of a method 600 to indicate compatibility. In some configurations, the method 600 may be performed by the compatibility module 104.

At step 602, a link to a web page may be obtained. For example, the link to the web page may be obtained from a variety of sources (e.g., email, SMS, another web page, a document, a file, etc.). At step 604, a set of capabilities associated with a device may be obtained. At step 606, a set of requirements associated with the web page may be obtained. At step 608, a compatibility result may be determined based on the set of capabilities and the set of requirements. At step 610, the compatibility result may be indicated in connection with the link.

Figure 7:
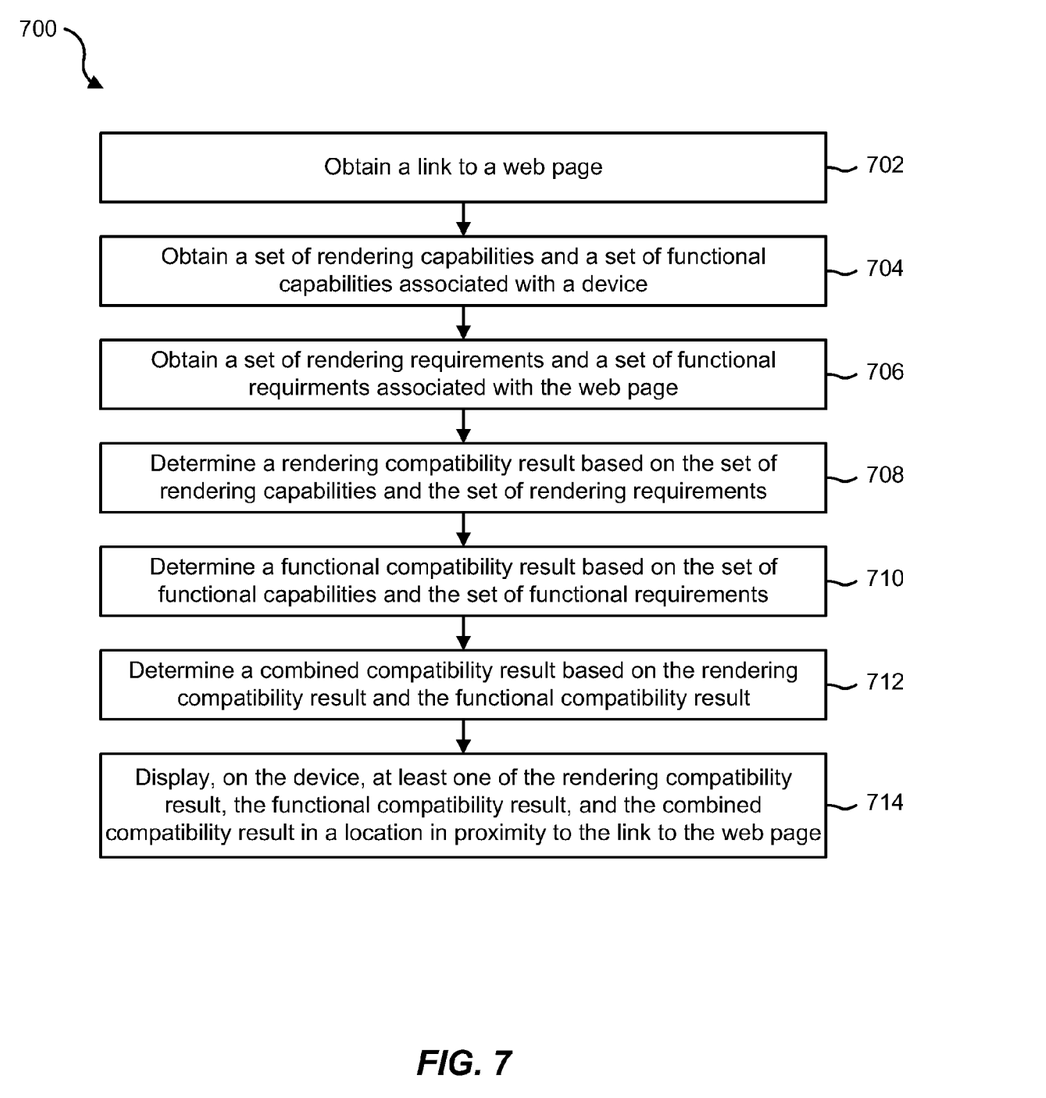
FIG. 7 is a flow diagram illustrating another example of a method to indicate compatibility.

FIG. 7 is a flow diagram illustrating another example of a method 700 to indicate compatibility. In some configurations, the method 700 may be performed by the compatibility module 104.

At step 702, a link to a web page may be obtained. At step 704, a set of rendering capabilities and a set of functional capabilities associated with a device may be obtained. At step 706, a set of rendering requirements and a set of functional requirements associated with the web page may be obtained. At step 708, a rendering compatibility result may be determined based on the set of rendering capabilities and the set of rendering requirements. At step 710, a functional compatibility result may be determined based on the set of functional capabilities and the set of functional requirements. At step 712, a combined compatibility result may optionally be determined based on the rendering compatibility result and the functional compatibility result. At step 714, at least one of the rendering compatibility result, the functional compatibility result, and the combined result may be indicated and/or displayed in a location in proximity to the link.

Figure 8:
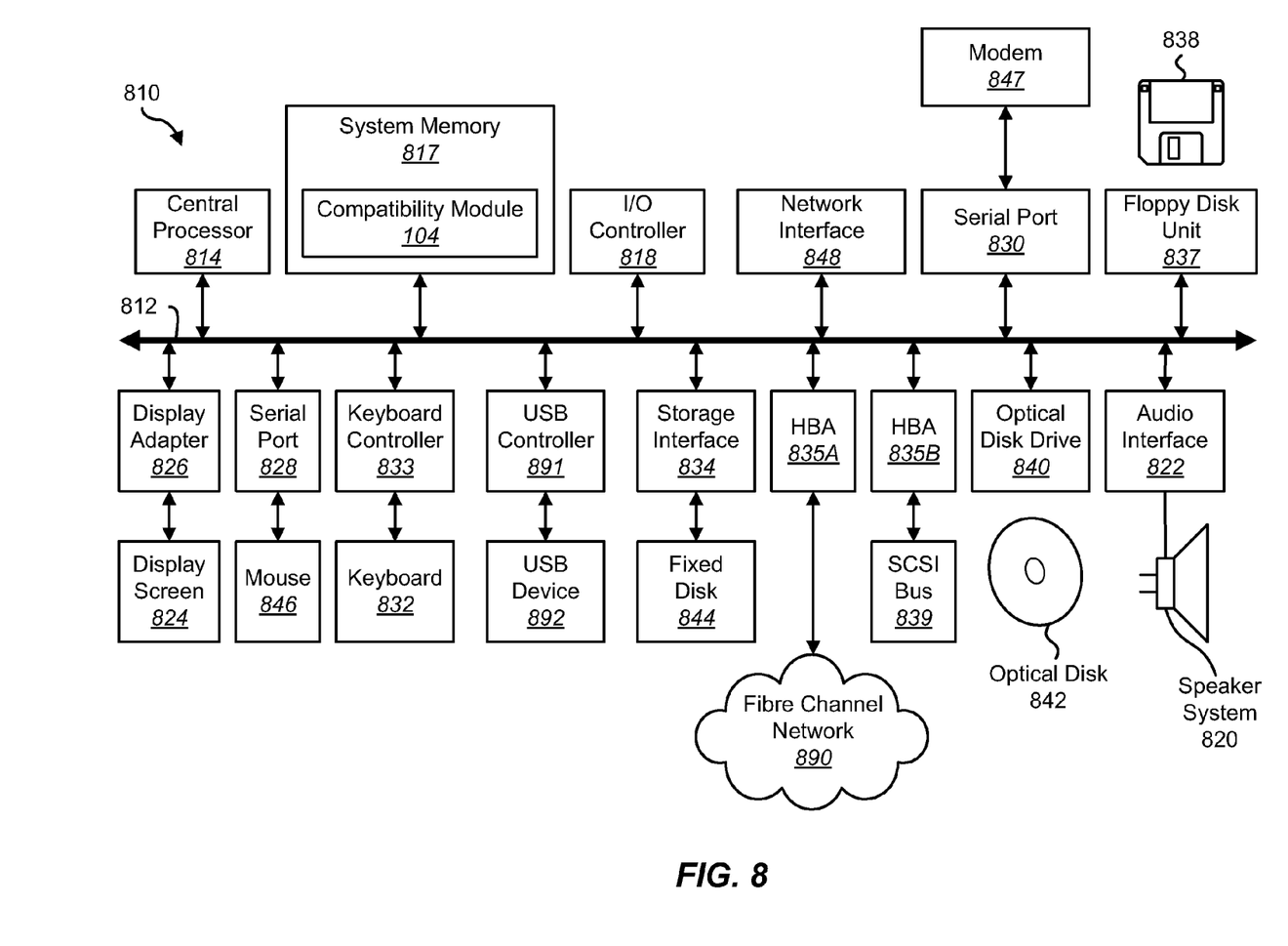
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 891), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the compatibility module 104 to implement the present systems and methods may be stored within the system memory 817. Applications resident with computer system 810 are generally stored on and accessed via a non-transitory computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in a non-transitory computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
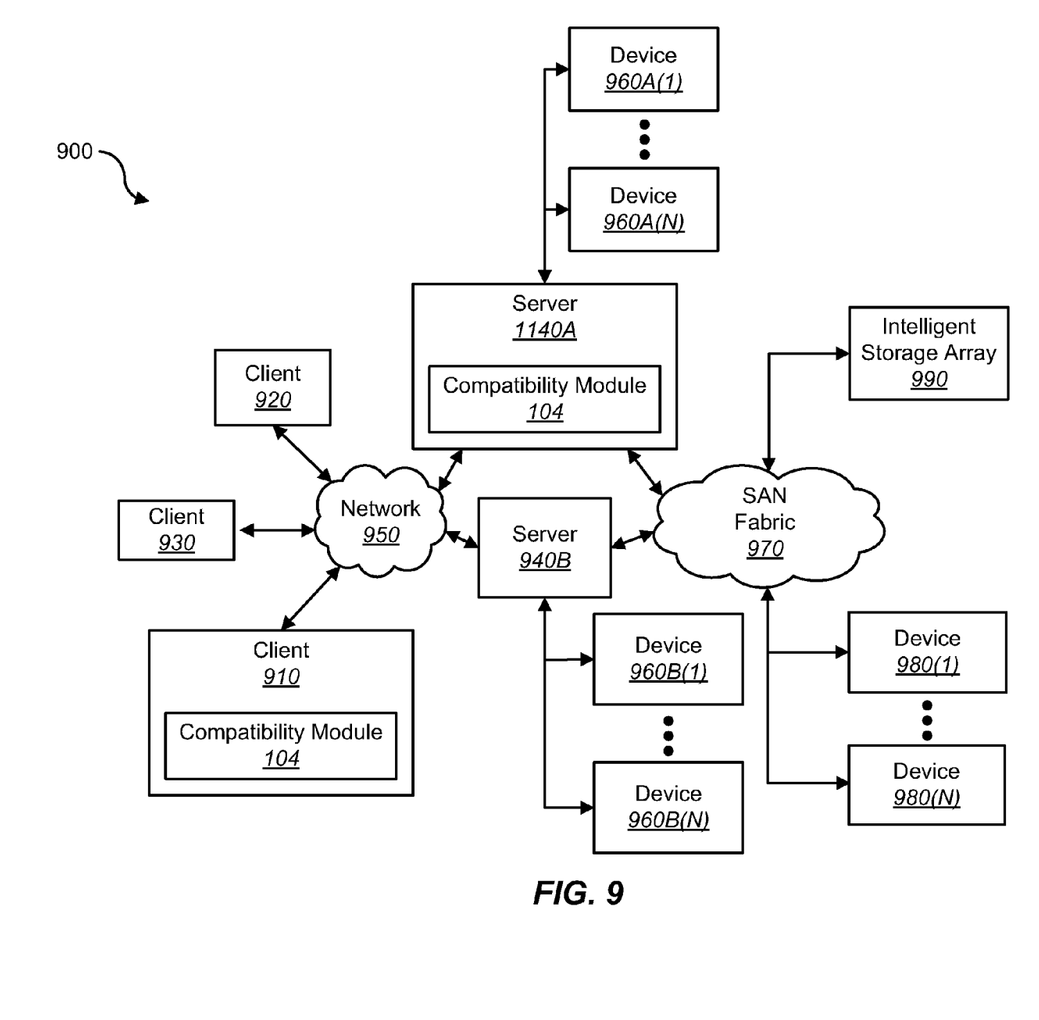
FIG. 9 is a block diagram depicting a network architecture in which client systems, as well as storage servers (any of which can be implemented using a computer system), are coupled to a network.

FIG. 9 is a block diagram depicting a network architecture 900 in which client systems 910, 920 and 930, as well as storage servers 940A, 940B (any of which can be implemented using computer system 810), are coupled to a network 950. In one embodiment, the compatibility module 104 may be located within the storage servers 940A, 940B and/or the client systems 910, 920, 930 to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A, 940B, and so by client systems 910, 920 and 930 via network 950. Intelligent storage array 990 is also shown as an example of a specific storage device accessible via SAN fabric 970.

With reference to computer system 810, modem 847, network interface 848, or some other method can be used to provide connectivity from each of client computer systems 910, 920, and 930 to network 950. Client systems 910, 920, and 930 are able to access information on storage server 940A or 940B using, for example, a web browser, or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to indicate compatibility, comprising:
   obtaining, by a processor, a link to a web page;
   obtaining, by the processor, a set of capabilities associated with a device, the set of capabilities comprising at least a rendering capability and a functional capability;
   obtaining, by the processor, a set of requirements associated with the web page;
   evaluating an impact of a requirement from the set of requirements that is unsupported by the device, the evaluation being based at least in part on a significance of the unsupported requirement to the web page, a frequency of the unsupported requirement in the web page, and an impact of the unsupported requirement on the device;
   determining, by the processor, a compatibility result for the web page based on the set of capabilities and the set of requirements and the evaluated impact of one or more unsupported requirements, wherein the compatibility result comprises a combined compatibility comprising a weighted combination of at least the rendering compatibility and the functional compatibility; and
   indicating, by the processor, the compatibility result in connection with the link to the web page.

2. The method of claim 1, wherein the compatibility result is indicated in a location that is in proximity to the link to the web page.

3. The method of claim 1, wherein the compatibility result is indicated when an input device performs a hovering action over the link to the web page.

4. The method of claim 1, wherein the set of capabilities comprises a set of rendering capabilities, wherein the set of requirements comprises a set of rendering requirements, and wherein the rendering compatibility is based on the set of rendering capabilities and the set of rendering requirements.

5. The method of claim 1, wherein the set of capabilities comprises a set of functional capabilities, wherein the set of requirements comprises a set of functional requirements, and wherein the functional compatibility is based on the set of functional capabilities and the set of functional requirements.

6. The method of claim 1, wherein indicating the compatibility result comprises displaying the compatibility result.

7. The method of claim 1, further comprising:
   testing the device to determine the set of capabilities; and
   testing the web page to determine the set of requirements.

8. The method of claim 1, further comprising:
   determining a compatibility result for each of multiple links on the web page; and
   prioritizing the multiple links based on the compatibility result associated with each link, wherein a link with a higher compatibility is arranged to be above a link with a lower compatibility result.

9. A computing device configured to indicate compatibility, comprising:
   a processor;
   memory in electronic communication with the processor;
   instructions stored in the memory, the instructions being executable by the processor to:
   obtain a link to a web page;
   obtain a set of capabilities associated with a device, the set of capabilities comprising at least a rendering capability and a functional capability;
   obtain a set of requirements associated with the web page;
   evaluate an impact of a requirement from the set of requirements that is unsupported by the device, the evaluation being based at least in part on a significance of the unsupported requirement to the web page, a frequency of the unsupported requirement in the web page, and an impact of the unsupported requirement on the device;
   determine a compatibility result for the web page based on the set of capabilities and the set of requirements and the evaluated impact of one or more unsupported requirements, wherein the compatibility result comprises a combined compatibility comprising a weighted combination of the rendering compatibility and the functional compatibility; and indicate the compatibility result in connection with the link to the web page.

10. The computing device of claim 9, wherein the compatibility result is indicated in a location that is in proximity to the link to the web page.

11. The computing device of claim 9, wherein the compatibility result is indicated when an input device performs a hovering action over the link to the web page.

12. The computing device of claim 9, wherein the set of capabilities comprises a set of rendering capabilities, wherein the set of requirements comprises a set of rendering requirements, and wherein the rendering compatibility is based on the set of rendering capabilities and the set of rendering requirements.

13. The computing device of claim 9, wherein the set of capabilities comprises a set of functional capabilities, wherein the set of requirements comprises a set of functional requirements, and wherein the functional compatibility is based on the set of functional capabilities and the set of functional requirements.

14. The computing device of claim 9, wherein indicating the compatibility result comprises displaying the compatibility result.

15. The computing device of claim 9, wherein the instructions are further executable by the processor to:
   test the device to determine the set of capabilities; and
   test the web page to determine the set of requirements.

16. A computer-program product to indicate compatibility, the computer-program product comprising a non-transitory computer-readable storage medium that stores computer executable instructions, the instructions being executable by a processor to:
   obtain a link to a web page;
   obtain a set of capabilities associated with a device, the set of capabilities comprising at least a rendering capability and a functional capability;
   obtain a set of requirements associated with the web page;
   evaluate an impact of a requirement from the set of requirements that is unsupported by the device, the evaluation being based at least in part on a significance of the unsupported requirement to the web page, a frequency of the unsupported requirement in the web page, and an impact of the unsupported requirement on the device;
   determine a compatibility result for the web page based on the set of capabilities and the set of requirements and the evaluated impact of one or more unsupported requirements, wherein the compatibility result is indicated as a percentage, and wherein the compatibility result comprises a combined compatibility comprising a weighted combination of the rendering compatibility and the functional compatibility; and
   indicate the compatibility result in connection with the link to the web page.

17. The computer-program product of claim 16, wherein the compatibility result is indicated in a location that is in proximity to the link to the web page.

\* \* \* \* \*